(12) United States Patent
Pamu et al.

(10) Patent No.: US 8,724,693 B2
(45) Date of Patent: May 13, 2014

(54) MECHANISM FOR AUTOMATIC NETWORK DATA COMPRESSION ON A NETWORK CONNECTION

(75) Inventors: Srinivas Pamu, Bangalore (IN); Kant C. Patel, Fremont, CA (US); Feroz Alam Khan, Bangalore (IN); Abhishek Dadhich, Bangalore (IN); Saravanakumar Ramasubramanian, Bangalore (IN); Bhaskar Mathur, Bangalore (IN)

(73) Assignee: Oracle International Corporation, Redmond Shores, CA (US)

( * ) Notice: Subject to any disclaimer, the term of this patent is extended or adjusted under 35 U.S.C. 154(b) by 35 days.

(21) Appl. No.: 13/469,358

(22) Filed: May 11, 2012

(65) Prior Publication Data

US 2013/0301430 A1    Nov. 14, 2013

(51) Int. Cl.
  *H04B 1/66* (2006.01)
  *H04J 3/22* (2006.01)

(52) U.S. Cl.
  USPC ............................ 375/240; 370/252; 370/468

(58) Field of Classification Search
  USPC ........ 370/252, 392; 375/240, 240.25, E7.026
  See application file for complete search history.

(56) References Cited

U.S. PATENT DOCUMENTS

| | | | |
|---|---|---|---|
| 6,947,483 B2 * | 9/2005 | Engwer | 375/240 |
| 6,963,924 B1 * | 11/2005 | Huang et al. | 709/238 |
| 7,260,651 B2 * | 8/2007 | Parrella et al. | 709/247 |
| 2002/0004390 A1 * | 1/2002 | Cutaia et al. | 455/424 |
| 2002/0085631 A1 * | 7/2002 | Engwer | 375/240 |
| 2003/0184813 A1 | 10/2003 | Kobayashi et al. | |
| 2009/0046775 A1 | 2/2009 | Thiagarajan et al. | |
| 2009/0089626 A1 * | 4/2009 | Gotch et al. | 714/45 |
| 2010/0104025 A1 * | 4/2010 | Rose et al. | 375/240.27 |
| 2011/0199948 A1 | 8/2011 | Wang et al. | |

OTHER PUBLICATIONS

European Patent Office, "Office Action" in application No. PCT/US2013/036787, dated Jun. 25, 2013, 9 pages.
Current Claims in application No. PCT/US2013/036787, dated Jun. 2013, 4 pages.

* cited by examiner

*Primary Examiner* — Kerri Rose
(74) *Attorney, Agent, or Firm* — Hickman Palermo Truong Becker Bingham Wong LLP (57) ABSTRACT

The techniques are provided automatically detecting when performing pre-transmission compression on data to be sent over a network connection will be preferable to sending the data uncompressed, and for automatically performing pre-transmission compression only when doing so is determined to be beneficial. The techniques involve performing compression on sample data. The time it takes to perform the compression on the sample data, along with the reduction in size achieved by the compression, are factors used to automatically determine whether compressing data before sending the data over a network connection will achieve better results that sending the data uncompressed. In some embodiments, multiple compression algorithm/compression level combinations are tested at different points in the transmission. At each point, the sending device may switch to the algorithm/level combination that is producing the best results on the current sample.

14 Claims, 3 Drawing Sheets

MECHANISM FOR AUTOMATIC NETWORK DATA COMPRESSION ON A NETWORK CONNECTION

FIELD OF THE INVENTION

The present invention relates to communications over a network and, more specifically, to techniques for determining whether or not to compress data that is to be sent over a network.

BACKGROUND

One of the problems faced by many network engineers is reducing the network data flowing across limited-bandwidth network connections. One way to effectively transmit more data through such a limited-bandwidth connection is to compress the data at the sending device prior to sending, and decompress the data at the receiving device after the compressed data has been transmitted over the connection.

Unfortunately, compression is not always the best solution. For example, in some circumstances, the overhead associated with compressing and decompressing the data may be greater than the benefit achieved by sending the data in compressed format. Thus, systems that always compress data, and systems that never compress data, are likely to experience situations in which they are operating inefficiently. Further, even in systems that support both modes of operation, it is difficult to determine which setting to use. Even when an administrator is able to determine the best overall mode, configuring the device to use that mode may still result in inefficiency during some network transmission operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for automatically determining when it would be more efficient to compress data to be sent over a network connection, and to compress the data prior to sending the data over the connection only when it is determined that doing so will be more efficient.

Figure 1:
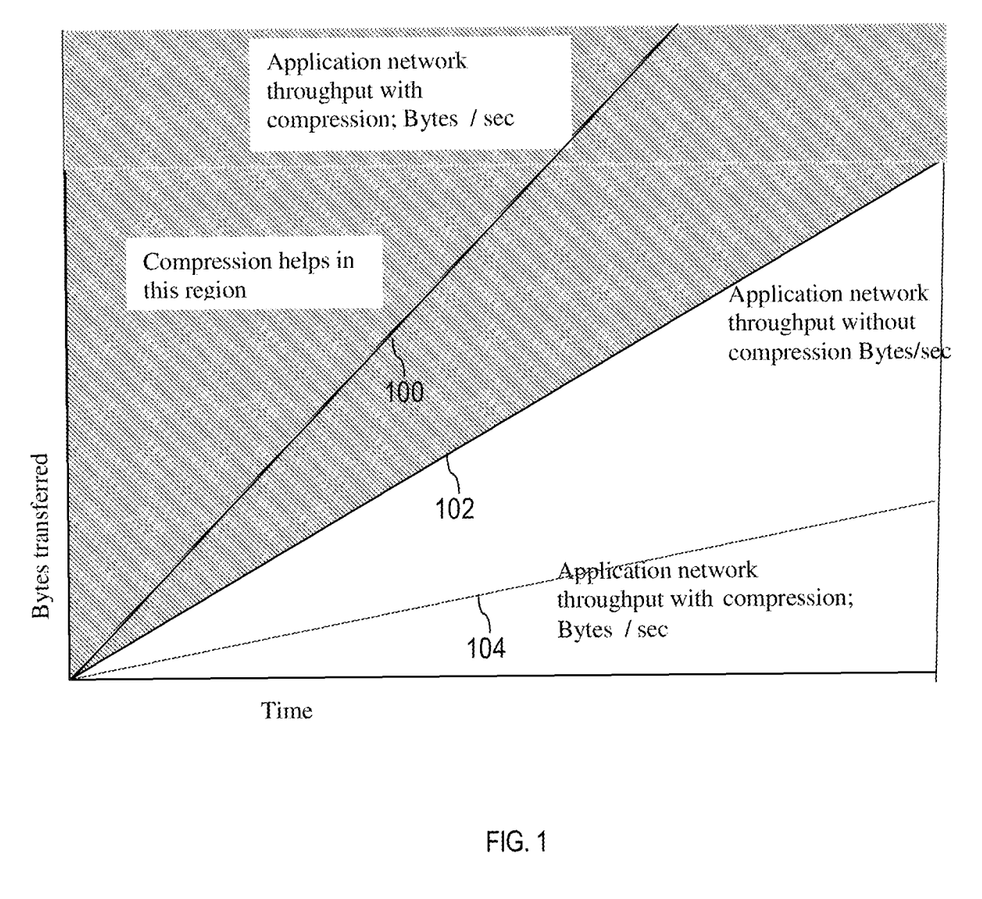
FIG. 1 is a graph illustrating how compressing data prior to transmission of the data over a network connection may result in either superior or inferior overall transmission rates.

Referring to FIG. 1, it is a diagram representing the effect of compression on network throughput seen by an application. The X axis represents the time it takes to send data, while the Y axis represents the amount of data sent. Line 102 represents uncompressed data transmissions over the network connection. Lines 100 and 104 represent two possible outcomes produced by compressing the data prior to transmission. In the case of line 100 (and any line that falls into the shaded section of the graph), the data compression results in the effective transmission of more bytes per second than would be achieved by sending the same data uncompressed. On the other hand, line 104 (and any line that falls in the unshaded portion of the graph) represents the situation where compression actually decreases efficiency, resulting in effectively fewer bytes per second than the uncompressed case.

The techniques described herein are for automatically detecting when compressing data will result in outcomes above (and better than) uncompressed line 102. When compressing data will result in outcomes above (and better than) uncompressed line 102, pre-transmission compression is automatically performed. When compressing data will not result in outcomes above (and better than) uncompressed line 102, pre-transmission compression is not performed.

According to one embodiment, the achievable network throughput is determined, and compression is performed on sample data. The time it takes to perform the compression on the sample data, along with the reduction in size achieved by the compression, are factors used to automatically determine whether compressing data before sending the data over a network connection will achieve better results than sending the data uncompressed. If it is determined that compressing the data will achieve better results, then the data is compressed before it is transmitted over the network connection. On the other hand, if it is determined that compressing the data would not be beneficial, then the data is sent over the network connection uncompressed.

The determination of whether to compress may be made once for an entire transmission session, or may be made periodically during the session. When made periodically, the decision of whether to compress may change during the transmission, resulting in some of the transmission being sent after compression, and some of the transmission being sent without compression.

Embodiments are described hereafter in which multiple compression algorithm/compression level combinations are tested at different points in the transmission. At each point, the sending device may switch to the algorithm/level combination that is producing the best results on the current sample. Further, the sending device can transition in response to other events, such as the currently-selected algorithm/level combination producing highly inefficient results. The decision of whether to compress, and which algorithm/level combination to use if compression is beneficial, may also take into account other factors such as current processor load and possible power savings.

Determining Whether to Compress

As mentioned above, a pre-transmission compression determination mechanism ("PTCDM") is provided for automatically determining whether to use compression prior to transmitting data over a network connection, and only compressing the data prior to transmission when it is determined that compression will be beneficial. An embodiment shall be described herein where the data to be sent over the transmission is organized in fixed length protocol data units (PDUs). However, the techniques are not limited to any particular protocol or packetization scheme.

According to one embodiment, the PTCDM helps a network application to automate the decision of whether to perform pre-transmission compression based on current session data. Such a PTCDM relieves network engineers from doing field investigations and expending the effort required to analyze the collected data to determine static configuration compression options to turn compression on or off.

Figure 2:
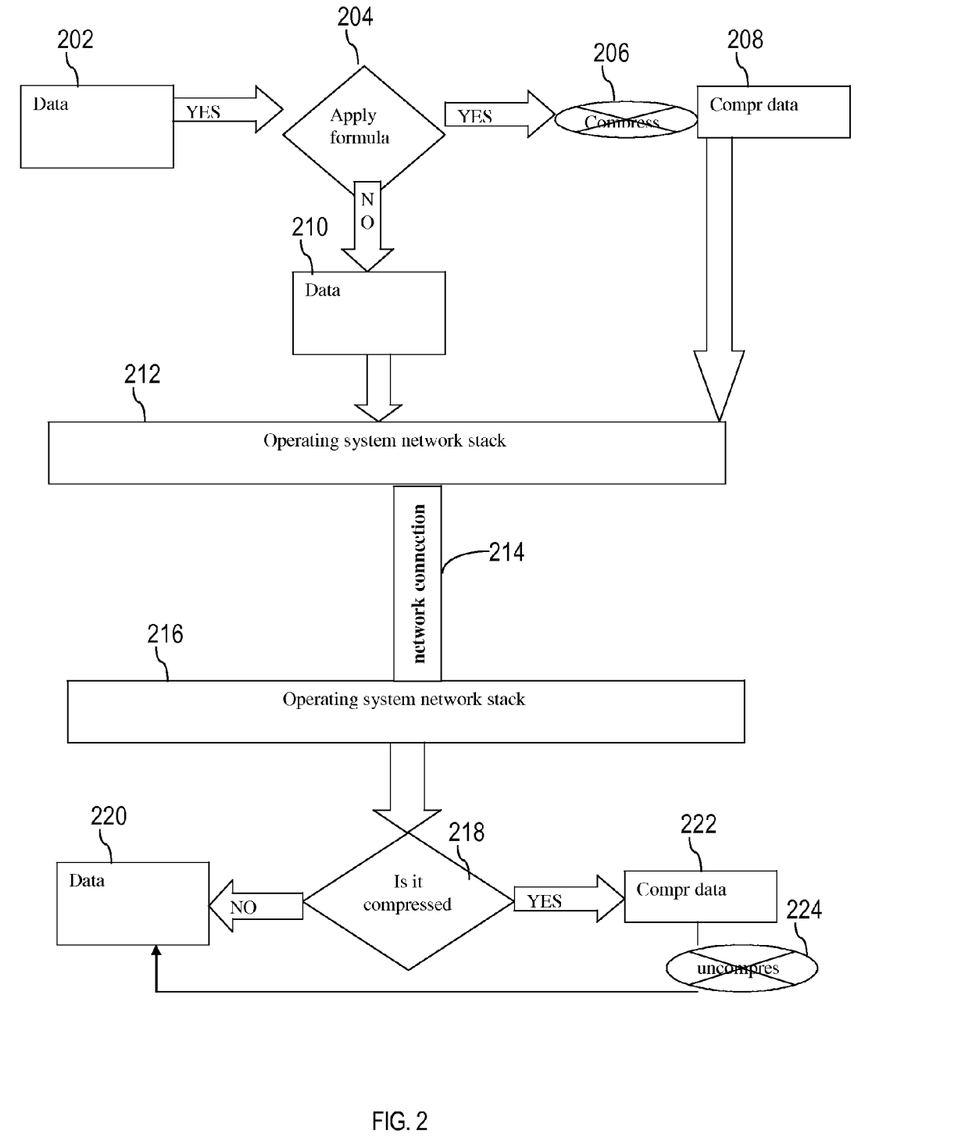
FIG. 2 is a block diagram illustrating a system that automatically determines whether to compress data prior to transmission over a network connection, and compresses the data only when compression is determined to be beneficial, according to an embodiment of the invention.

Referring to FIG. 2, it is a block diagram that schematically represents a system that includes a PTCDM for automatically turning pre-transmission compression on or off, depending on a variety of factors. Data 202 represents data that is to be transmitted over the network connection during a particular operation or session. While data 202 is represented as a known entity, the entire stream of to-be-transmitted data is often not known at the time the transmission is requested. In fact, depending on the nature of the operation, even the amount of data that will be transmitted during an operation or session is not known a priori. The techniques described herein are applicable both to dynamic content generation (where the amount of data is not known a priori) and to static content, where the data length is known upfront.

At block 204, the PTCDM applies a formula to the data 202 to determine whether compression will be beneficial. As shall be explained in detail below, applying the formula to data 202 may involve performing compression on a set of sample data taken from data 202. The specific formula used, and the factors used by the formula, may vary from implementation to implementation. Specific embodiments of the formula, and the factors involved in those embodiments, are described in greater detail hereafter.

If, at block 204, the PTCDM determines that pre-transmission compression will be beneficial, data 202 is compressed as illustrated in block 206 to produce compressed data 208, which is then sent to the operating system network stack 212 of the transmitting device, to cause the data to ultimately be sent over network connection 214. On the other hand, if, at block 204, the PTCDM determines that pre-transmission compression will not be beneficial, then uncompressed data 210 is provided to the operating system network stack 212 of the transmitting device, to cause the uncompressed data 210 to be sent over network connection 214.

The data that is transmitted over network connection 214 is received by the operating system network stack 216 of the receiving device. In block 218, the receiving device determines whether the received data is compressed. If the received data is compressed, then the compressed data 222 is uncompressed within the receiving device, as illustrated by block 224, to produce uncompressed data 220. If the received data is not compressed, the received data is provided as data 220 to the entity to which the data was sent, without any need for decompression.

Example Formula

As mentioned above, PTCDM decides whether to employ pre-transmission compression by applying a formula, as illustrated at block 204 in FIG. 2. The formula may be any formula designed to determine whether compression will fall above or below line 102 in FIG. 1. Various factors may be used to make such a determination. According to one embodiment, the PTCDM uses a formula that takes into account at least the following factors:

ATP=achievable network throughput measured by network throughput measuring tool between client machine and server machine.

Tcipq=Time of compression of i th PDU in a flight of n PDUs with p compression algorithm with q compression level. Assuming de-compression time is less than or equal to compression time.

Bcipq=Bytes after compression of i th PDU in a flight of n PDUs with p compression algorithm with q compression level.

Bi=Bytes with no compression of i th PDU in a flight of n PDUs

An example formula that takes into account these factors is illustrated as Equation 1 below:

$$\sum_{i=0}^{n}(2 \times Tcipq) + \sum_{i=0}^{n}(Bcipq/ATP) < \sum_{i=0}^{n}(Bi/ATP) \qquad \text{EQUATION 1}$$

In Equation 1, the left-hand side of the inequality operation corresponds to time consumed by compressing and transmitting data. The right hand side of the inequality operation corresponds to time consumed by transmitting the same data without pre-transmission compression. If the parameters satisfy above inequality (i.e. if Equation 1 evaluates to TRUE), then pre-transmission compression would be beneficial, otherwise pre-transmission compression would not be beneficial. As shall be described in greater detail hereafter, the formula used by the PTCDM can also be used to select the best compression algorithm, among multiple available compression algorithms, by iterating the calculation on the available set of compression algorithms.

In another application, where the server processing includes a request and response driven model, the formula for determining whether to perform automatic pre-transmission compression may include additional terms, such as:

Btcip=Bytes after compression present in TCP send buffer when i th PDU is about to send with p compression algorithm.

Bti=Bytes in TCP send buffer when i th PDU is about to send.

An example formula that takes into account these additional factors is illustrated as Equation 2 below:

$$\sum_{i=0}^{n}Tcip + \sum_{i=0}^{n}(Bcip/ATP) + \sum_{i=0}^{n}(Btcip/ATP) < \qquad \text{EQUATION 2}$$
$$\sum_{i=0}^{n}(Bi/ATP) + \sum_{i=0}^{n}(Bti/ATP)$$

In order for the PTCDM to evaluate any formula, such as Equation 1 or 2, values have to be obtained for the parameters specified in the formula. Many of those values may be obtained in any one of a variety of ways, and the techniques described herein are not limited to any particular way of obtaining the values. For example, in one embodiment, the achievable network throughput (ATP) is measured using throughput measuring tools over a period of time and an average estimate of that value can be taken. In an alternative embodiment, ATP can be retrieved from the Operating System Kernel by making system call to an interface provided by certain Operating Systems. Several well-known implementations of operating systems have such facility.

In one embodiment, values for the variable Tcipq and Bcipq are obtained by performing compression on a sample set of data. In one embodiment, the sample set of data is obtained from the set of data that is to be transmitted over the network connection. In alternative embodiments, the sample set of data may be other data that has characteristics similar to the data that is to be sent over the connection. For example, the sample data may be from a set of previously-transmitted data that is of the same type as the to-be-transmitted data.

The amount of data that is used as the sample data may vary from situation to situation based on a variety of factors. For example, in one embodiment, the amount of sample data is a particular fraction of the data to be sent (e.g. 10% of data 202 may be selected as the sample data). In situations where the amount of data to be sent is not known ahead of time, the size of the sample data may be a predetermined size, such as four PDUs.

Once a sample has been identified, the size of the PDUs in the sample are used as Bi, the time it takes to compress each PDU in the sample is used as Tcipq, and the size of the compressed PDUs from sample is used as Bcipq. In Equation 1, the time it takes to compress each sample Tcipq is multiplied by two, under the assumption that it takes approximately as long to decompress the data as it takes to compress the data. However, in alternative embodiments, rather than assume that those times are equal, a decompression operation may be performed on the compressed sample. The actual time it takes to decompress the compressed sample PDU may be added to the time it takes to compress the sample PDU, rather than simply multiplying the compression time by two.

The process of compressing sample PDUs may be repeated any number of times, and the results of each compression may be summed as indicated in Equation 1, where the test compression is repeated over n sample PDUs. Once the process of generating the values for Equation 1 is completed, Equation 1 is evaluated based on the values thus obtained. As mentioned above, when the equation evaluates to TRUE, pre-transmission compression is employed on the data 202. On the other hand, when the equation evaluates to FALSE, the data is transmitted without performing pre-transmission compression.

Selecting Among Compression Algorithms and/or Compression Levels

As mentioned above, the PTCDM applies a formula, such as Equation 1, to determine whether pre-transmission compression would be beneficial. However, that determination is only valid for the specific compression algorithm, the specific compression level, and the specific sample PDUs that were used to gather the values for the formula. Different compression algorithms and/or compression levels may yield significantly different results. For example, compressing the sample data using a compression algorithm C1 at level 1 may yield results that indicate that there is no benefit to performing pre-transmission compression. However, compressing the sample data using compression algorithm C1 at level 3 may yield results that indicate pre-transmission compression is beneficial. Further, compressing the sample data using compression algorithm C2 at level 1 may yield even better results.

According to one embodiment, to determine the best compression algorithm and/or level of compression for a given transmission, the sample data is compressed using multiple available compression algorithms and levels. The resulting values are then applied to Equation 1 to find out the best suited algorithm and best suited level. For example, if there are two compression algorithms X and Y, and each algorithm is capable of 2 compression levels, then Equation 1 may be evaluated using values obtained by using X at compression level 1, using X at compression level 2, using Y at compression level 1, and using Y at compression level 2, and the results can be compared to select the best algorithm and compression level.

In one embodiment, the various compression algorithm/compression-level combination are all tested prior to transmitting the data. However, in alternative embodiments, various optimizations can be employed to avoid the overhead of trying multiple algorithms/compression-levels each time. For example, after transmission of the data has been started (with or without compression) the work of compressing sample data with different algorithm/compression-level combinations, and applying Equation 1, can performed in a background thread. Alternatively, different algorithm/compression-level combinations may be performed at different points of time during the transmission of the data. When it is determined that compression using a different algorithm/compression-level combination will achieve superior results than what is currently being used in the transmission, the sending device transitions to the new algorithm/compression level. Similarly, when it is determined that ceasing pre-transmission compression will yield better results than what is currently being used in the transmission, the sending device transitions to sending uncompressed data.

Each new test has the potential to cause the sending device to change the way it is transmitting the data during a session or operation. Consequently, in embodiments where testing is repeatedly performed while data is being transmitted, the data stream from the same session/operation may include any number of:
  stream segments that are uncompressed,
  stream segments that are compressed using one algorithm/compression-level combination, and
  steam segments that are compressed using other algorithm/compression-level combinations.

Example Implementations

As mentioned above, there are a variety of ways in which the PTCDM may be implemented. For example, in one embodiment, the PTCDM uses Equation 1 to drive the decision dynamically, as explained hereafter.

Assume that a network application is sending bulk data by sending many Protocol Data Units (PDUs) in one direction. In this scenario, the PTCDM (which can be external to or a module of the network application) can use Equation 1 based on values obtained by performing compressions on a fixed number of initial PDUs (sampling PDUs). The truth value obtained by plugging the compression results from the sampling PDUs into Equation 1 can be used to decide whether or not to compress the rest of the PDUs in that flight, assuming the variance in compression times of the rest of the PDUs is within limits of Equation 1.

As mentioned above, the sampling size can vary depending on data characteristics. For example, in a certain implementations, depending on the broader characteristics of the data, it could be 10% of the total expected PDUs if the size of PDU flight is known, or the first 5 PDUs if all PDUs are not know upfront.

When compression is decided based on the initial PDU samples, the subsequent PDU compress times and/or sizes can be fed back to Equation 1 to arrive at better running average of times and/or sizes. These running averages can be used to drive the compression decision of yet-to-be-sent PDUs. This process could be repeated for next flight of packets. Thus, rather than use the results of compressing the sample data to determine how all other flights of packets are handled, the results from the sample data may only determine how the first flight of packets are handled. The results (time and/or size) of compressing the first flight of packets are used to determine how the second flight of packets is handled, etc.

In embodiments where running averages are maintained, the running averages may weigh the results of flights differently, based on how recently the flights were sent. For example, assume that a sixth flight of packets is about to be sent over the network connection. Whether the sixth flight of packets is compressed prior to transmission is based on compression results from the five previously-sent flights of packets. However, rather than weight the results of those five previously-sent flights equally, the results of the fifth (and most recent) flight may be given most weight, while the first (and least recent) flight may be given the least weight.

If at any time it is determined that pre-transmission compression is no longer providing a benefit, pre-transmission compression stops, and the PTCDM returns to periodically running compression tests on samples taken from the to-be-transmitted data. The frequency of those tests may vary from implementation to implementation, based on a variety of factors. For example, in one implementation, the smaller the difference between the left and right sides of Equation 1, the more frequent the testing. Conversely, the greater the difference between the left and right sides of Equation 1, the less frequent the testing.

Compression Decisions for Devices with Power Saving Modes

The parameters identified in Equation 1 are merely examples of factors that may be used to determine whether pre-transmission compression is beneficial. Some embodiments may take into account other factors which may or may not relate to the effective transmission rate of the data. For example, some devices, such as mobile devices, may have power saving modes that cause the devices to consume less power when the load on their processors falls below a certain threshold. Even in the absence of any power-saving modes, some mobile device users may prefer to lower the amount of processing in order to extend battery life. In one embodiment, the desired mode of operation or aggressiveness of power-savings may be configurable on the device. In these circumstances, it may be desirable to avoid pre-transmission compression when pre-transmission compression will result in only a slight improvement in effective transmission rate.

Consequently, in some implementations, power characteristics are given weight in the formula used to determine whether to perform pre-transmission compression, after looking at the CPU consumption level during the sampling time. For example, in such an embodiment, the decision of whether to perform pre-transmission compression may be based on the following formula:

$$\sum_{i=0}^{n}(2 \times Tcipq) + \sum_{i=0}^{n}(Bcipq/ATP) < \sum_{i=0}^{n}(Bi/ATP) - k \quad \text{EQUATION 3}$$

Equation 3 is similar to Equation 1 except that a constant k is subtracted from the right-hand side of the equation. In this example, k represents how much transmission rate improvement is required to justify the use of pre-transmission compression in a situation where use of the pre-transmission compression will prevent the use of a power saving mode. Thus, the effective-transmission-rate benefit of using pre-transmission compression must exceed the threshold represented by k before pre-transmission compression will actually be used.

As another example, even when no device involved in the transmission has a low-power mode, there may be some cost to the increased processing load caused by compression and decompression. This cost may be trivial when the devices involved in the transmission have a relatively light load. However, if the transmission occurs when one or both of the devices is already operating at or near a full processing load, the additional burden of performing compression or decompression may have a noticeable detrimental effect on the performance of the device. Therefore, according to one embodiment, the current processing load of one or both of devices involved in the transmission may be a factor in the formula used to decide whether or not to perform pre-transmission compression. In the case where the determination is made at the transmitting device, a PTCDM on the transmitting device may query the receiving device to determine the receiving device's current load, to obtain the processing load value to use when applying the formula. The current load information may be gathered only for the initial application of the formula, or may be gathered each time the formula is applied during the transmission of data.

Ancillary Benefits and Contexts

Even when non-transmission-rate factors, such as power saving and current processing loads, are not explicitly accounted for in the formula used by the PTCDM, the techniques described herein may produce ancillary benefits in those areas. For example, using the techniques described herein may result in power savings when, for example, the transmission involves a device with a power saving option and a preference for compression. Specifically, assume that the transmission of data is to be from an application server or web server to a mobile device browser. Under these circumstances, the web server or application server can use the techniques described herein to determine when to perform pre-transmission compression. When the server determines that pre-transmission compression is not beneficial, the server may send the data uncompressed even though doing so is contrary to the mobile device's preferences. As a result, less power is consumed on the mobile device (because the mobile device need not leave low-power mode to perform de-compression).

There is no limit to the number of contexts in which the techniques described herein may be employed. For example, one context where a PTCDM can be used is in an environment in which a database server sends a large number of rows, as a result set, to a database client application, across a WAN connection. As another example, the techniques may be used when a Web server or Application server with a compression option is serving web pages/application to web browsers capable of de-compression, connected across a WAN. Further, a WAN is merely one example of a type of network across which data may be transmitted. The techniques described herein are applicable to data transmissions across any form of limited-bandwidth media, including WANs, LANs, direct peer-to-peer wired or wireless connections, busses and grids.

Example Transmission Scenario

For the purpose of explanation, assume that a database client application executing on a client device has sent a query to a database server executing on a server device, where the client device is connected to the server device over a network connection. Assume further that 10,000 PDUs are required to transmit the result set of the query from the database server to the database client application. For the purpose of explanation, it shall also be assumed that the database client application and the database server both support compression using two compression algorithms C1 and C2, each of which support two compression levels L1 and L2.

Under these circumstances, at time T1 before any of the result set has been transmitted to the client, the database server may obtain the current achievable network throughput of the network connection, and compress the first 10 PDUs of the result set using C1L1 and C1L2. In this example, not all compression algorithm/compression level combinations are initially performed on the first sample set because doing so may result in an unacceptable amount of latency. When less than all combinations are tried, the combinations that are tried may be selected based on historical information. For example, historical data may indicate that C1 has proven to be better than C2 at compressing the type of information that is being returned in the result set. For a different type of information, the historical information may indicate that C2 is better.

Compressing the first 10 PDUs with C1L1 will consume a certain amount of time tC1L1, and produce compressed data of a certain size sC1L1. Likewise, compressing the first 10 PDUs with C1L2 will consume a certain amount of time tC1L2 and produce compressed data of a certain size sC1L2. Having obtained these values, Equation 1 may be applied using the values from C1L1 to determine if pre-transmission compression using C1L1 will produce a better effective transmission rate than sending the data uncompressed. Equation 1 may then be applied again using the values from C1L2 to determine if pre-transmission compression using C1L2 will produce a better effective transmission rate than sending the data uncompressed.

If neither C1L1 nor C1L2 produce a better effective transmission rate than sending the data uncompressed, then the first flight of PDUs is sent uncompressed. If only one of C1L1 and C1L2 produces a better effective transmission rate than sending the data uncompressed, then the first flight of PDUs is sent using pre-transmission compression based on the combination that produced the superior results. On the other hand, if both C1L1 and C1L2 would result in better effective transmission rates than would be obtained using no compression, then the combination that produced the best results is used to compress the first flight of PDUs.

For the purpose of explanation, it will be assumed that the 10,000 PDUs of the result set is divided into ten flights of 1,000 PDUs. However, the boundaries between flights may vary from implementation to implementation. For example, rather than establish flights to have a certain number of PDUs, the flights may be divided by time. In an embodiment that divides flights by time, the PDUs sent during a first fixed-length period of time may be treated as the first flight, the PDUs sent during a second fixed-length period of time may constitute the second flight, etc.

In the present example, it shall be assumed that both C1L1 and C1L2 were determined to produce better effective transmission rates than sending the data uncompressed, and that the results of C1L1 were better than those of C1L2. Under these circumstances, the PTCDM used by the database server determines to use C1L1 to perform pre-transmission compression on the first flight of 1,000 PDUs. As the first flight of 1,000 PDUs is compressed and sent to the client device, the server device monitors the time that it takes to perform the compression, and the size of compressed data thus produced. This size and time data can be gathered for all outgoing PDUs of the first flight, or for a selected subset. For example, the time and size information may be obtained for every $100^{th}$ PDU.

At the end of the first flight (time T2), the PTCDM on the server device once again uses Equation 1 to determine whether C1L1 should continue to be used for the second flight. To determine the effective rate produced by C1L1, the data obtained from the first flight of PDUs may be used instead of or in addition to the data obtained from the first sample set of 10 PDUs. At this point (or in the background while the first flight of PDUs is being transmitted), the PTCDM on server device may also apply the C2L1 and C2L2 combinations to a sample set of PDUs. The PTCDM then uses Equation 1 to determine whether using C1L1, C2L1, C2L2, or no compression at all, will produce the best effective transmission rate for the second flight of PDUs.

For the purpose of explanation, it shall be assumed that at time T2 the PTCDM determines that sending the data uncompressed produces the highest effective transfer rate. Based on this decision, the second flight of 1,000 PDUs is sent without any compression. During the transmission of the second flight, the PTCDM on the server device may test one of more of the compression algorithm/level combinations on a third sample set taken from the second flight. The combinations tested may be all possible combinations, the least recently tested combinations, the combinations that have previously produced the best results, or some combination thereof.

After the second flight has been transmitted (time T3), the sending device may once again switch the manner in which the PDUs are sent if the testing that was performed during the transmission of the second flight indicates that a particular compression combination will produce a higher effective transmission rate than would be achieved with no compression. For the purpose of explanation, assume that, during the third round of testing, it is determined that pre-transmission compression using C2L1 will produce the best effective transmission rate. Under these circumstances, C2L1 is used to perform pre-transmission compression on the third flight of 1,000 PDUs.

The process of re-testing the compression combinations against relatively recent samples extracted from the to-be-sent data, and changing the compression accordingly between flights, continues until the entire 10,000 PDUs have been sent to the receiving device. Depending on the number of compression algorithm/compression level combinations supported, it is possible for each of flights to be compressed using a different algorithm/level combination. On the other hand, it is also possible that the same algorithm/level combination produces the best results at each testing iteration, and therefor is used for sending all flights of PDUs.

In the foregoing example, any switching between algorithm/level combinations is done at the end of each flight. However, in alternative embodiments, other events may trigger a mid-flight change of algorithm/level combination. For example, assume that, applying C1L1 to the first flight of PDUs begins to produce highly inefficient results (e.g. little compression and/or long compression times). If the results of these tests become sufficiently bad, the server device may automatically perform a mid-flight switch to a different algorithm/level combination, or to uncompressed transmission.

In some embodiments, the frequency of testing may vary based on how much better a selected algorithm/level combination is to the alternatives. For example, if after three rounds of testing the C1L1 combination has consistently produced results that are far superior to uncompressed transmission and any other algorithm/level combination, then testing iterations may cease or be reduced. For example, rather than test after each flight, testing may be performed every other flight, or every fifth flight. By reducing the testing under these circumstances, less processing is wasted on tests that are unlikely to result in any algorithm/level changes.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
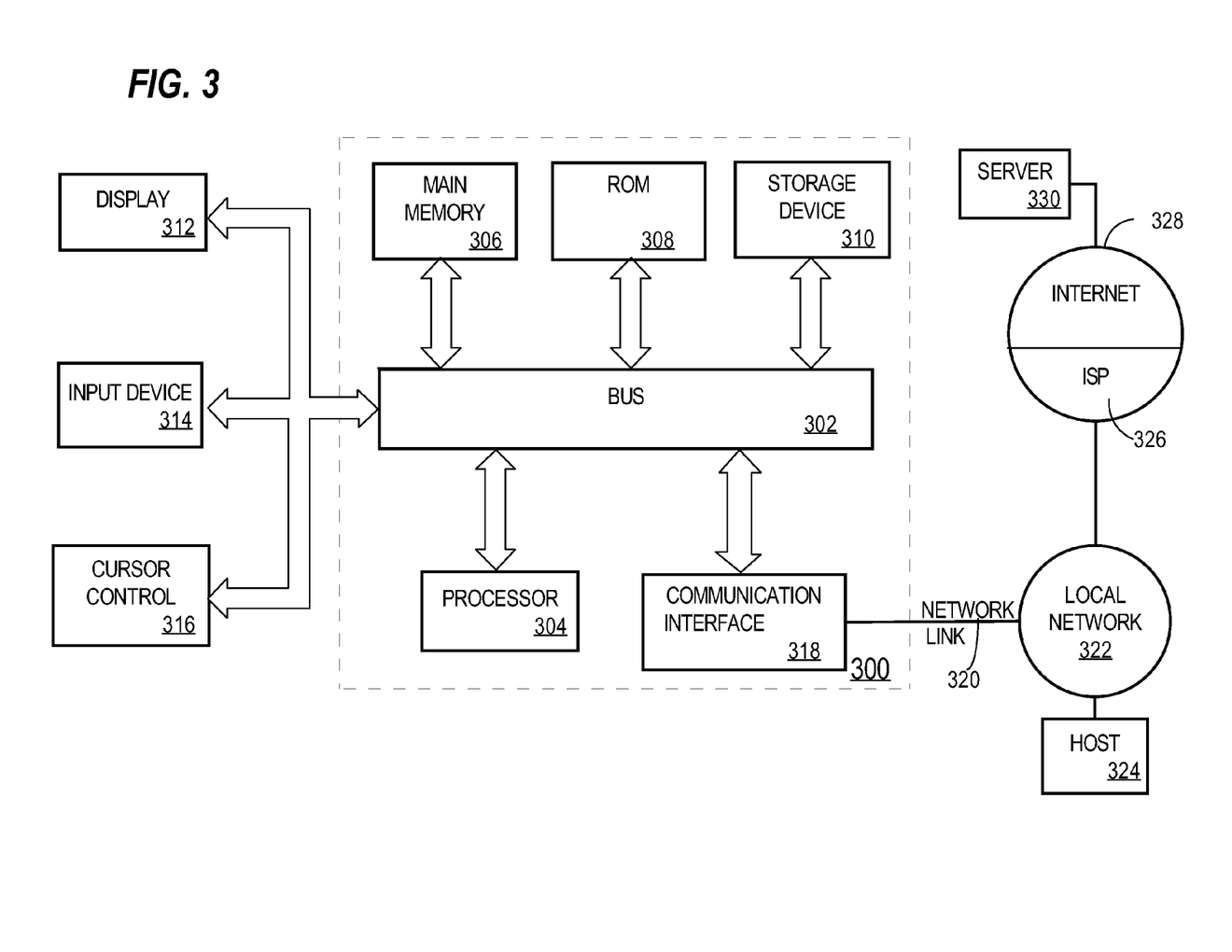
FIG. 3 is a block diagram of a computer system upon which embodiments of the invention may be implemented.

For example, FIG. 3 is a block diagram that illustrates a computer system 300 upon which an embodiment of the invention may be implemented. Computer system 300 includes a bus 302 or other communication PTCDM for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   prior to sending data from a first device to a second device over a network connection, performing the steps of:
   performing a compression operation on at least one sample that has a first size;
   determining a first amount of time that was required to perform the compression operation;
   determining a second size of compressed data produced by the compression operation;
   based, at least in part, on the first size and an achievable rate of the network connection, determining a first value that estimates a cost of transmitting the data over the network connection without compression;
   based, at least in part, on the second size, the first amount of time, and the achievable rate of the network connection, determining a second value that estimates a cost of transmitting the data over the network connection with pre-transmission compression; and
   determining whether to perform pre-transmission compression on at least a portion of the data based, at least in part, on whether the second value is less than the first value;
   responsive to determining to perform pre-transmission compression on the at least a portion of the data, causing the first device to compress the at least a portion of the data prior to transmitting the at least a portion of the data to the second device; and
   responsive to determining to not perform pre-transmission compression on the at least a portion of the data, causing the first device to send the at least a portion of the data to the second device without compression;
   wherein the compression operation is a first compression operation using a first technique;
   wherein the at least a portion of the data is a first flight of a plurality of flights of the data;
   wherein the first flight is compressed using the first technique prior to being transmitted across the network connection;
   while the first flight is being transmitted, tracking compression times and sizes produced by compressing the first flight using the first technique; and
   based, at least in part on the compression times and sizes produced by compressing the first flight using the first technique, determining whether to compress a second flight of the data using the first technique prior to transmitting the second flight across the network connection;
   after transmission of the first flight has been initiated, and before transmission of a second flight of the data is initiated, performing the steps of:
   performing a second compression operation that uses a second technique to compress at least one sample from the first flight;
   determining a second amount of time that was required to perform the second compression operation;
   determining a third size of compressed data produced by the second compression operation; and
   based, at least in part, on the third size, the second amount of time, and the achievable rate of the network connection, determining a third value that estimates a cost of transmitting the data over the network connection with pre-transmission compression using the second technique; and
   based, at least in part on the third value, determining whether to send the second flight with pre-transmission compression using the first technique, with pre-transmission compression using the second technique, or with no pre-transmission compression
   wherein the method is performed by one or more computing devices.

2. The method of claim 1 wherein the first technique uses a first compression algorithm and a first compression level and the second technique uses the first compression algorithm and a second compression level.

3. The method of claim 1 wherein the first technique uses a first compression algorithm and the second technique uses a second compression algorithm.

4. The method of claim 1 further comprising sending the second flight with pre-transmission compression using the second technique.

5. The method of claim 1 wherein at least one of the first value and the second value is based, in part, on a factor that is not related to effective transmission rates.

6. The method of claim 5 wherein the factor is power savings that would result by not using pre-transmission compression.

7. The method of claim 5 wherein the factor is processor load reduction that would result by not using pre-transmission compression.

8. One or more non-transitory storage media storing instructions which, when executed by one or more computing devices, cause performance of a method comprising:
   prior to sending data from a first device to a second device over a network connection, performing the steps of:
   performing a compression operation on at least one sample that has a first size;
   determining a first amount of time that was required to perform the compression operation;
   determining a second size of compressed data produced by the compression operation;
   based, at least in part, on the first size and an achievable rate of the network connection, determining a first value that estimates a cost of transmitting the data over the network connection without compression;

based, at least in part, on the second size, the first amount of time, and the achievable rate of the network connection, determining a second value that estimates a cost of transmitting the data over the network connection with pre-transmission compression; and determining whether to perform pre-transmission compression on at least a portion of the data based, at least in part, on whether the second value is less than the first value;

responsive to determining to perform pre-transmission compression on the at least a portion of the data, causing the first device to compress the at least a portion of the data prior to transmitting the at least a portion of the data to the second device; and responsive to determining to not perform pre-transmission compression on the at least a portion of the data, causing the first device to send the at least a portion of the data to the second device without compression;

wherein the compression operation is a first compression operation using a first technique;

wherein the at least a portion of the data is a first flight of a plurality of flights of the data;

wherein the first flight is compressed using the first technique prior to being transmitted across the network connection;

while the first flight is being transmitted, tracking compression times and sizes produced by compressing the first flight using the first technique; and based, at least in part on the compression times and sizes produced by compressing the first flight using the first technique, determining whether to compress a second flight of the data using the first technique prior to transmitting the second flight across the network connection;

after transmission of the first flight has been initiated, and before transmission of a second flight of the data is initiated, performing the steps of:

performing a second compression operation that uses a second technique to compress at least one sample from the first flight;

determining a second amount of time that was required to perform the second compression operation;

determining a third size of compressed data produced by the second compression operation; and based, at least in part, on the third size, the second amount of time, and the achievable rate of the network connection, determining a third value that estimates a cost of transmitting the data over the network connection with pre-transmission compression using the second technique; and based, at least in part on the third value, determining whether to send the second flight with pre-transmission compression using the first technique, with pre-transmission compression using the second technique, or with no pre-transmission compression.

9. The one or more non-transitory storage media of claim 8 wherein the first technique uses a first compression algorithm and a first compression level and the second technique uses the first compression algorithm and a second compression level.

10. The one or more non-transitory storage media of claim 8 wherein the first technique uses a first compression algorithm and the second technique uses a second compression algorithm.

11. The one or more non-transitory storage media of claim 8 wherein the method further comprises sending the second flight with pre-transmission compression using the second technique.

12. The one or more non-transitory storage media of claim 8 wherein at least one of the first value and the second value is based, in part, on a factor that is not related to effective transmission rates.

13. The one or more non-transitory storage media of claim 12 wherein the factor is power savings that would result by not using pre-transmission compression.

14. The one or more non-transitory storage media of claim 12 wherein the fact is processor load reduction that would result by not using pre-transmission compression.

* * * * *

UNITED STATES PATENT AND TRADEMARK OFFICE
CERTIFICATE OF CORRECTION

PATENT NO. : 8,724,693 B2
APPLICATION NO. : 13/469358
DATED : May 13, 2014
INVENTOR(S) : Pamu et al.

Page 1 of 1

It is certified that error appears in the above-identified patent and that said Letters Patent is hereby corrected as shown below:

On title page, column 1, under Assignee, line 2, delete "Redmond" and insert -- Redwood --, therefor.

On title page, column 2, under Abstract, line 11, delete "that" and insert -- than --, therefor.

In the Claims

Column 16, line 38, in Claim 14, delete "fact" and insert -- factor --, therefor.

Signed and Sealed this
Fourteenth Day of October, 2014

Michelle K. Lee
*Deputy Director of the United States Patent and Trademark Office*